United States Patent Office 3,839,448
Patented Oct. 1, 1974

3,839,448
METHOD FOR PRODUCING α-AMINOCYCLO-
ALKANONE OXIME HYDROCHLORIDE
Shinzo Imamura, Nagoya, Kyosuke Yotsumoto, Aichi-ken, and Rokuro Harada, Nagoya, Japan, assignors to Toray Industries, Inc., Tokyo, Japan
No Drawing. Filed Oct. 26, 1970, Ser. No. 84,201
Claims priority, application Japan, Dec. 22, 1969,
44/102,539
Int. Cl. C07c 131/02
U.S. Cl. 260—566 A                                   8 Claims

ABSTRACT OF THE DISCLOSURE

Method for producing α-aminocycloalkanone oxime hydrochloride by reacting bis (2-chloro - 1 - nitroso cycloalkane) with ammonia at 0–150° under pressure.

GENERAL FIELD OF THE INVENTION

This invention relates to a method for producing α-aminocycloalkanone oxime hydrochloride by reacting bis (2-chloro-1-nitroso cycloalkane) with ammonia at elevated temperature.

α-aminocycloalkanone oxime hydrochlorides are useful raw materials. For example, such a compound can be converted to α-amino lactam by Beckmann's rearrangement and useful amino acids can be obtained by hydrolysis of the resulting product. α-aminocyclohexanone oxime hydrochloride is an especially important raw material for the production of lysine, which is one of the essential amino acids.

DISCUSSION OF THE PRIOR ART

Heretofore, various methods for producing α-aminocycloalkanone oxime have been suggested, for example, (1) the method of reacting alicyclic α-acyloxy oxime with ammonia or a primary or secondary amine (Japanese patent publication No. 42-23,177), and (2) the method of reacting 2-chloro cyclohexanone with hydroxylamine in liquid ammonia (Japanese patent publication No. 44-21,704). Further, for producing α-aminocyclododecanone oxime, a method has been suggested comprising reacting α-chlorocyclododecadienone oxime with a primary or secondary amine and reducing the resulting product with hydrogen (Japanese patent publication No. 42-10,501).

However the method (1), which consists of the steps of (a) reacting an unsaturated alicyclic hydrocarbon with nitrosyl chloride to form α-chloro oxime, (b) reacting the resulting product with a metal carboxylate such as sodium acetate and (c) amination of the acyloxy radical of the α-position of the resulting product with ammonia or amine is quite complicated. Further, this process has the further drawback that the resulting α-aminocycloalkanone oxime tends to enter into a side reaction during the main reaction to form a dioxime having a secondary amino group. Therefore, it is difficult to obtain the desired compound only.

The method (2) is undesirable with respect to the yield of the desired compound.

The method (3) in which α-chloro oxime is employed as a starting material, and also the method (1) are also undesirable because of limited yield of the desired compound.

It is accordingly an object of this invention to provide a method for producing α-aminocycloalkanone oxime hydrochloride in a high yield.

A further object of this invention is to provide a novel starting material for producing α-aminocycloalkanone oximes.

Other objects and advantages of this invention will become further apparent hereinafter.

SUMMARY OF THE INVENTION

It has been found that a bis (2-chloro-1-nitroso cycloalkane) may be reacted with ammonia at an elevated temperature to form a cycloalkanone oxime hydrochloride having a primary amino group at its α-position (α-aminocycloalkanone oxime hydrochloride).

DETAILED DESCRIPTION OF THE INVENTION

The objects of this invention have been achieved by reacting 1 mol of bis (2-chloro-1-nitroso cycloalkane) with at least 20 mols of ammonia at an elevated temperature.

The starting material, bis (2-chloro-1-nitroso cycloalkane) is represented by the following formula:

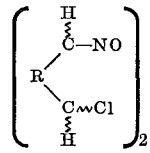

wherein R is an alkylene group having 3 to 10 carbon atoms and "∿" represents stereo isomerism. Specific compounds include, for example, bis (2-chloro-1-nitroso cyclopentane), bis (2-chloro-1-nitroso cyclohexane), bis (2-chloro-1-nitroso cycloheptane), bis (2-chloro-1-nitroso cyclooctane), bis (2-chloro-1-nitroso cyclonane) and bis (2-chloro-1-nitroso cyclododecane) and these are preferred in the practice of this invention.

These starting materials can be produced by well known conventional methods, for example, by reacting cyclic mono olefines having 5 to 12 carbon atoms with nitrosylchloride for example in liquid sulphurous acid or a halogenated hydrocarbon such as trichlorethylene, carbon tetrachloride, chloroform and methylene chloride as solvents.

The bis (2-chloro-1-nitroso cycloalkane) thus obtained consists of two isomers (the trans-form and the cis-form) and either isomer or a mixture thereof is readily employed as the starting material of this invention.

When bis (2-chloro-1-nitroso cycloalkane) is produced by means of the above mentioned methods, a small amount of 2-chloro-1-nitroso cycloalkane (monomeric form) is also obtained as a by-product. This monomeric form forms α-aminocycloalkanone oxime hydrochloride by an amination reaction of this invention. Therefore, it is not necessary to separate the monomeric form from the starting material of this invention thus obtained. However, if the content of the monomeric form in the starting material is greater than a tenth part in a molar ratio, it may be preferred to decrease its content by refining in order to obtain satisfactory results.

The amount of ammonia used in the reaction is a very important factor according to this invention.

Theoretically, it should be two mols per mol of bis (2-chloro-1-nitroso cycloalkane). However, though 10 mols of ammonia to 1 mol of bis (2-chloro-1-nitroso cycloalkane) are used in this reaction, the yield of α-aminocycloalkanone oxime hydrochloride is at most 40%. Further, there is the disadvantage that α-aminocycloalkanone oxime having a secondary amino group is produced as by-product in a comparatively high ratio, and the formation of pyrazine derivatives is caused in this reaction. Since these pyrazine derivatives are stable compounds it is difficult to convert them to other useful compounds. Further, as these compounds are weakly basic, when a starting material for producing α-amino acid contains such compounds it is difficult to separate them from the resulting reaction mixture.

However, surprisingly, when ammonia is used in a molar proportion of at least 20 times the bis (2-chloro-1-nitroso cycloalkane), the undesirable effects are remarkably reduced. Indeed, the molar quantity of ammonia should be at least 20 times but preferably at least 100 times the molar quantity of bis (2-chloro-1-nitroso-cycloalkane). The maximum amount of ammonia is limited only by economic considerations and may be up to 1000 mols/mol or even above.

Solvent is preferable but it may or may not be used in this invention. Water, lower alkyl alcohols such as methyl alcohol, ethylalcohol and iso-propylalcohol, cyclic ethers such as ethylene oxide, tetrahydrofuran and dioxane and mixtures thereof are preferred. 0 to 200 parts by mol of solvent based on 1 part by mol of bis (2-chloro-1-nitroso cycloalkane) are preferred.

The reaction temperatures differ, depending upon the reaction conditions, such as the starting material bis-(2-chloro-1-nitroso-cycloalkane), the presence or absence of solvent and the type of solvent. However, the reaction is normally carried out at about 0–150° C., preferably about 50–90° C.

The reaction time is not limited critically, but the reaction is normally carried out for about 15 minutes to about 2 hours.

According to this invention, the process for producing α-aminocycloalkanone oxime hydrochloride can be made very simple in comparison with other well known methods and α-primary aminocycloalkanone oxime hydrochloride can be obtained with a higher yield.

Next, this invention will be described more specifically by reference to examples; however, it is understood that the scope of the claims is not intended to be limited by these examples.

All percentages in the examples are percentages by weight.

Example 1

14.76 grams (0.05 mol) of bis (2-chloro-1-nitroso cyclohexane) (melting point of 150–153° C., trans-isomer) and 100 milli-liters of methyl alcohol were poured into an autoclave, i.e., a pressure reactor, having 1 liter capacity. The autoclave was cooled to −40° C. in order to avoid loss of liquid ammonia and 170 grams (10 mol) of liquid ammonia were poured into the autoclave. The mixture was heated to about 70° C. and was maintained for 1 hour at this temperature.

After finishing the reaction, liquid ammonia was removed. The remaining reaction mixture was poured into a flask containing methyl alcohol and the methyl alcohol was removed under reduced pressure.

100 milli-liters of water were poured into the flask and 0.82 gram of water-insoluble crystals were removed by filtration. These water-insoluble crystals were an α-aminocyclohexanone oxime having a secondary amino group.

On the other hand, 0.1 gram of benzene-soluble octa hydro phenazine was removed from the filtrate by extracting twice with 25 milli-liters of benzene. The remaining aqueous solution was treated at 50° C. under 20 mm. pressure and water was removed. 15.03 grams of α-primary amino cyclohexanone oxime hydrochloride were obtained.

Example 2

14.76 grams (0.05 mol) of bis (2-chloro-1-nitroso cyclohexane) (melting point of 131–133° C.; cis-isomer) were added to the autoclave used in Example 1 and 170 grams (10 mol) of liquid ammonia were also added to the autoclave. The mixture was reacted at 60° C. for 1 hour.

After finishing the reaction, liquid ammonia was removed from the reaction mixture and 100 milli-liters of water were added to the autoclave to dissolve the reaction mixture.

By methods similar to Example 1, 15.04 grams (91.37%) of α-amino cyclohexanone oxime hydrochloride having a primary amino group, 0.76 gram (6.35%) of α-amino cyclohexanone oxime having a secondary amino group and 0.12 grams (1.27%) of octahydrophenazine were obtained.

Example 3

According to the method of Example 1 (except changing the amount of ammonia used), various further runs were carried out, and Table 1 which follows shows the results.

TABLE 1

| | Percent yield of— | | |
|---|---|---|---|
| | Oxime 1 | Oxime 2 | OHP |
| NH₃ (by mol): | | | |
| 4 times | 34.04 | 60.76 | 5.95 |
| 10 times | 42.79 | 50.48 | 5.72 |
| 20 times | 53.95 | 40.76 | 4.46 |
| 100 times | 81.29 | 15.88 | 1.81 |
| 200 times | 91.33 | 6.85 | 1.06 |
| 400 times | 97.74 | 1.17 | 1.06 |

In the table, "NH₃" means the molar ratio of ammonia used in relation to the bis (2-chloro-1-nitroso cyclohexane)-trans and "oxime 1" and "oxime 2" are respectively represented as α-amino cyclohexanone oxime hydrochloride having a primary amino group and α-amino cyclohexanone oxime having a secondary amino group. The expression "OHP" means octahydrophenazine.

Example 4

13.36 grams of bis (2-chloro-1-nitroso cyclopentane) (melting point of 128–129° C.) and 50 milli-liters of methyl alcohol were added to an autoclave and further 500 milli-liters of liquid ammonia were added to the autoclave while cooling at −40° C. The mixture was heated to about 70° C. and the reaction was carried out at this temperature for 1 hour. After reacting the mixture, ammonia was removed and methyl alcohol was also removed under reduced pressure.

15 grams of crystalline of α - aminocyclopentanone oxime hydrochloride (melting point of 178–179° C.) were obtained.

In order to confirm this result, 3 grams of this salt were dissolved in a solvent consisting of 15 milli-liters of methyl alcohol and 5 milli-liters of 10% hydrochloric acid. The solution was boiled for 3 hours while refluxed and then the solvent was removed. 2.5 grams of α-aminocyclopentanone hydrochloride (melting point of 145–146° C.) were obtained.

Example 5

17.6 grams of bis (2-chloro-1-nitroso cyclooctane) (melting point of 91–92° C.) and 50 milli-liter of methyl alcohol were added to an autoclave and further 500 milli-liters of liquid ammonia were added to the autoclave while cooling at −40° C. The mixture was heated to about 60° C. and the reaction was carried out at this temperature for 2 hours. After reacting, ammonia and methyl alcohol were removed.

18.5 grams of crystals of α-aminocyclooctanone oxime hydrochloride were obtained.

In order to confirm this result, 4 grams of this salt were dissolved in a solvent consisting of 20 milli-liters of methyl alcohol and 5 milli-liters of 10% hydrochloric acid. The solution was boiled for 3 hours while refluxed and then the solvent was removed.

3.3 grams of crystals of α-aminocyclooctanone hydrochloride (melting point of 200-201° C.) were obtained.

Example 6

23.2 grams of bis (2-chliro-1-nitroso cyclododecane and 100 milli-liters of methyl alcohol were added to an autoclave and further 500 milli-liters of liquid ammonia were added to the autoclave. The mixture was heated at about 70° C. for 1 hour. After reacting, ammonia was removed and methyl alcohol was also removed under reduced pressure.

24 grams of α-aminocyclododecanone oxime hydrochloride were obtained.

24 grams of this salt were added to 100 grams of 105% sulfuric acid maintained at about 80° C. and the reaction was carried out for about 1 hour. The reaction mixture thus obtained was diluted to one-tenth by water and passed through an H type cation exchange resin (known in the trade as Amberlite 200).

The compound thus absorbed by the cation exchange resin was dissolved in ammonia and concentrated. The solution thus concentrated was neutralized by means of hydrochloric acid and 20 grams of α-amino-ω-laurolactam hydrochloride (melting point of 249–254° C.) and 3 grams of $C_2H_{40}N_2$ represented by the following formula were obtained.

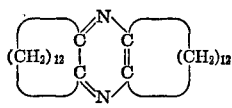

Example 7

In a process as described in Example 1, using 100 milli-liters of tetrahydrofuran as a solvent instead of methyl alcohol, 14.48 grams of α-aminocyclohexanone oxime hydrochloride, 2.02 grams of α-aminocyclohexanone oxime having a secondary amino group and 0.1 gram of octahydrophenazine were obtained.

Example 8

13.36 grams of bis (2-chloro-1-nitroso cyclopentane) (M.P. 128–129° C.) in 50 milli-liters of iso-propyl alcohol and 500 milli-liters of liquid ammonia were poured into an autoclave having 1 liter capacity. The mixture was heated to about 70° C. and maintained at this temperature for 1 hour. After the reaction was complete, ammonia and iso-propyl alcohol were removed under reduced pressure. 14.8 grams of α-aminocyclopentanone oxime hydrochloride were thus obtained.

Example 9

17.6 grams of bis (2-chloro-1-nitroso cyclooctanone) (M.P. 91–92° C.) in 100 milli-liters of dioxan and 500 milli-liters of liquid ammonia were poured into an autoclave of 1 liter capacity. The mixture was heated to about 65° C. and maintained at this temperature for 2 hours. After the reaction was complete, ammonia and dioxan were removed by evaporation and 17.9 grams of crystal of α-aminocycloctanone oxime hydrochloride were obtained.

The following is claimed:

1. A method for producing an α-aminocycloalkanone oxime hydrochloride, which comprises reacting ammonia with a bis-(2-chloro-1-nitroso cycloalkane) having the formula

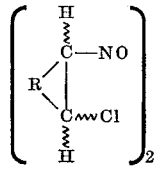

wherein R is an alkylene group having 3 to 10 carbon atoms and "∼" represents stereoisomerism, and wherein the molar proportion of ammonia to bis (2-chloro-1-nitroso cycloalkane) is at least 20 to 1, wherein said reaction is carried out at an elevated temperature, up to 150° C., and under pressure in a pressure reactor.

2. A method, as recited in claim 1, wherein said reaction is carried out at from 50 to 90° C.

3. The method according to claim 1, wherein the reaction is carried out in the presence of a solvent selected from the group consisting of lower alkyl alcohols, lower cyclic ethers, water and mixtures thereof.

4. The method according to claim 3, wherein said solvent is methyl alcohol.

5. The metrod according to claim 1 wherein said bis (2-chloro-1-nitroso cycloalkane) is bis (2-chloro-1-nitroso cyclopentane).

6. The method according to claim 1, wherein said bis (2-chloro-1-nitroso cycloalkane) is bis (2-chloro-1-nitroso cyclohexane).

7. The method according to claim 1, wherein said bis (2-chloro-1-nitroso cycloalkane) is bis (2-chloro-1-nitroso cyclooctane).

8. The method according to claim 1, wherein said bis (2-chloro-1-nitroso cycloalkane is bis (2-chloro-1-nitroso cyclododecane).

References Cited

UNITED STATES PATENTS 3,517,047   6/1970   Ohno et al _____ 260—566 A

LEON ZITVER, Primary Examiner

G. A. SCHWARTZ, Assistant Examiner